United States Patent
Nelson et al.

(10) Patent No.: US 10,227,989 B2
(45) Date of Patent: Mar. 12, 2019

(54) TAPER SLEEVE DRIVER FOR THRUST BEARING

(71) Applicant: General Electric Company, Schenectady, NY (US)

(72) Inventors: Andrew Michael Nelson, Moore, OK (US); Michael David Campell, Norman, OK (US); Johnathan Edward Peterson, Edmond, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 0 days.

(21) Appl. No.: 15/516,561

(22) PCT Filed: Oct. 1, 2014

(86) PCT No.: PCT/US2014/058661
§ 371 (c)(1),
(2) Date: Apr. 3, 2017

(87) PCT Pub. No.: WO2016/053334
PCT Pub. Date: Apr. 7, 2016

(65) Prior Publication Data
US 2017/0248150 A1   Aug. 31, 2017

(51) Int. Cl.
*F16C 17/04* (2006.01)
*F04D 29/041* (2006.01)
(Continued)

(52) U.S. Cl.
CPC .............. *F04D 29/041* (2013.01); *F04D 1/06* (2013.01); *F04D 13/02* (2013.01); *F04D 29/046* (2013.01);
(Continued)

(58) Field of Classification Search
CPC ........ F16C 17/04; F16C 17/065; F16C 21/00; F16C 35/02; F16C 35/10; F16C 35/073;
(Continued)

(56) References Cited

U.S. PATENT DOCUMENTS 2,043,272 A * 6/1936 Wallgren ................ F16C 17/02
384/272
3,470,754 A * 10/1969 Ferrara ..................... B06B 1/16
209/367
(Continued)

FOREIGN PATENT DOCUMENTS

RU     2524593 C2     7/2014

OTHER PUBLICATIONS

A PCT Search Report and Written Opinion issued in connection with corresponding PCT Application No. PCT/US2014/058661 dated Jun. 29, 2014.
(Continued)

*Primary Examiner* — Phillip A Johnson
(74) *Attorney, Agent, or Firm* — GE Global Patent Operation

(57) ABSTRACT

A thrust bearing assembly configured to reduce the axial displacement of a shaft includes a stationary thrust bearing, a thrust runner adjacent to the thrust bearing and a taper sleeve driver. The thrust runner includes a central passage. The taper sleeve driver includes an interior surface in contact with the shaft and an exterior surface in contact with the central passage of the thrust runner. The taper sleeve driver has a tapered exterior surface that applies a radially directed clamping force against the thrust runner as the taper sleeve driver is engaged within the central passage.

19 Claims, 5 Drawing Sheets

(51) Int. Cl.
  *F04D 1/06* (2006.01)
  *F04D 13/02* (2006.01)
  *F04D 29/046* (2006.01)
  *F16C 19/10* (2006.01)
(52) U.S. Cl.
  CPC .......... *F04D 29/0413* (2013.01); *F16C 19/10* (2013.01); *F16C 2360/44* (2013.01)
(58) Field of Classification Search
  CPC ...... F16C 2360/44; F01D 1/093; F01D 1/094; F04D 29/041; F04D 29/046; F04D 29/0462; F04D 29/049; F04D 29/051; F04D 29/056
  See application file for complete search history.

(56) References Cited

U.S. PATENT DOCUMENTS

| | | | |
|---|---|---|---|
| 3,734,579 A * | 5/1973 | Schumacher | B65G 39/09 301/108.3 |
| 4,304,502 A | 12/1981 | Stratienko | |
| 5,035,519 A | 7/1991 | Aizawa | |
| 5,957,656 A | 9/1999 | De Long | |
| 6,210,103 B1 | 4/2001 | Ramsay | |
| 2010/0260542 A1 | 10/2010 | Hewitt et al. | |
| 2013/0188895 A1 | 7/2013 | Devitt | |
| 2013/0266247 A1 | 10/2013 | Watson | |

OTHER PUBLICATIONS

Unofficial English Translation of Russian Office Action issued in connection with corresponding RU Application No. 2017113031 dated Jul. 17, 2018.

"Basics of design. Reference and methodical manual," Moscow Mechanical Engineering, vol. 2, pp. 295-296 (1977) (English Translation Unavailable).

Office Action issued in connection with corresponding CO Application No. 2017/0004347 dated Oct. 18, 2018.

Office Action issued in connection with corresponding RU Application No. 2017113031 dated Oct. 29, 2018.

* cited by examiner

TAPER SLEEVE DRIVER FOR THRUST BEARING

FIELD OF THE INVENTION

This invention relates generally to the field of pumping systems, and more particularly to an apparatus and method for connecting a thrust runner to a shaft.

BACKGROUND

Horizontal pumping systems are used in various industries for a variety of purposes. For example, in the oil and gas industry horizontal pumping systems are used to pump fluids, such as water separated from oil, to a remote destination, such as a tank or disposal well. Typically these horizontal pumping systems include a pump, a motor, and a suction housing positioned between the pump and the motor. A thrust chamber is also included between the motor and the suction housing.

During operation, the pump exerts a thrust that is conveyed along the shaft to the thrust chamber. The thrust chamber opposes the thrust generated by the pump and limits the axial displacement of the shaft. The thrust chamber includes a thrust runner connected to the rotating shaft and a stationary thrust bearing. The rotating thrust runner presses against the thrust bearing to unload the axial thrust generated by the pump.

In the past, the thrust runner has been connected to the shaft using a key-and-slot mechanism as the rotational connection in conjunction with some type of ring on the shaft as the axial connection. Although widely adopted, the use of a key-and-slot-ring mechanism may be undesirable because it allows a degree of radial movement between the shaft and the thrust runner as well as an imbalance. At elevated rotational speeds, the thrust runner may become radially offset adding to the imbalance. This may result in increased wear on the thrust runner and excess vibration in the shaft which in turn may cause wear on the connecting components resulting in a failure of the connection. There is, therefore, a need for an improved mechanism for securing the thrust runner to the shaft.

SUMMARY OF THE INVENTION

In a preferred embodiment, the present invention includes a thrust bearing assembly configured to reduce the axial displacement of a shaft. The thrust bearing assembly includes a stationary thrust bearing, a thrust runner adjacent to the thrust bearing and a taper sleeve driver. The thrust runner includes a central passage. The taper sleeve driver includes an interior surface in contact with the shaft and an exterior surface in contact with the central passage of the thrust runner. The taper sleeve driver has a tapered exterior surface that applies a radially directed clamping force against the thrust runner as the taper sleeve driver is engaged within the central passage.

In another aspect, the preferred embodiments include a horizontal pumping system that has a motor, a pump driven by the motor and a thrust chamber connected between the motor and the pump. The thrust chamber preferably includes a housing, a thrust chamber shaft that extends through the housing, and a thrust bearing assembly. The thrust bearing assembly includes a thrust runner having a central passage and a taper sleeve driver having an interior surface in contact with the thrust chamber shaft and an exterior surface in contact with the central passage.

In yet another aspect, the preferred embodiments include a thrust chamber for use in a horizontal pumping system. The thrust chamber includes a housing, a thrust chamber shaft that extends through the housing and a thrust bearing assembly. The thrust bearing assembly includes a taper sleeve driver that has an interior surface in contact with the thrust chamber shaft and an exterior surface. The thrust bearing assembly further includes a thrust runner that includes a central passage that is in contact with the exterior surface of the taper sleeve driver.

DETAILED DESCRIPTION OF THE PREFERRED EMBODIMENT

Figure 1:
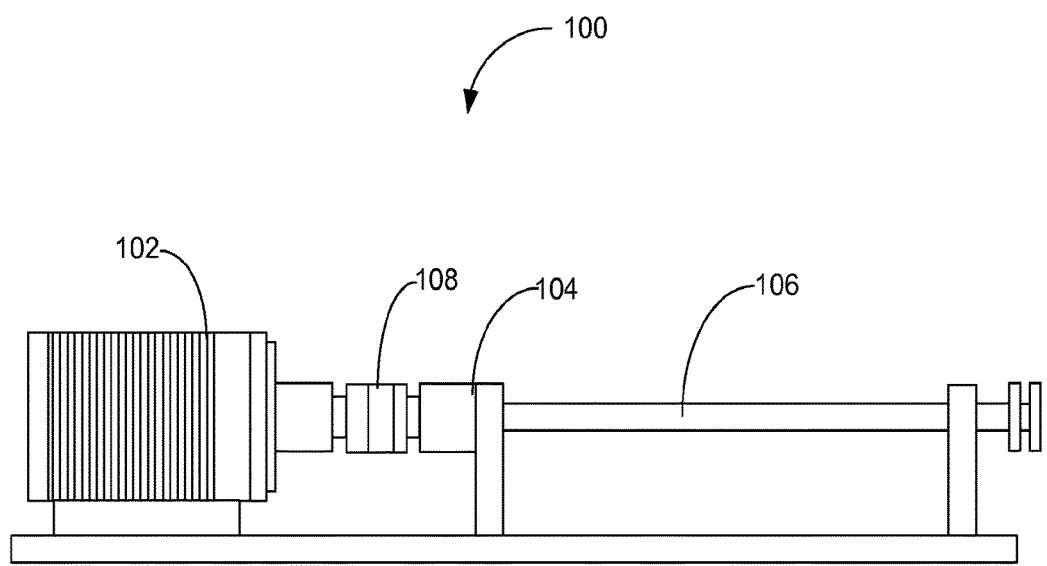
FIG. 1 is a side view of a horizontal pumping system constructed in accordance with a presently preferred embodiment.

In accordance with a preferred embodiment of the present invention, FIG. 1 shows a side view of a horizontal pumping system 100. The horizontal pumping system 100 includes a motor 102, a suction housing 104, a pump 106 and a thrust chamber 108. The suction housing 104 is connected between the pump 106 and the thrust chamber 108. The thrust chamber 108 is connected between the suction housing 104 and the motor 102. Generally, the motor 102 drives the pump 106 through a series of shafts (not visible in FIG. 1) that extend through the thrust chamber 108 and suction housing 104. Pumped fluids are provided to the suction housing 104 and pressurized by the pump 106. In a preferred embodiment, the pump 106 is a centrifugal pump. In a particularly preferred embodiment, the pump 106 is a multistage centrifugal pump.

Figure 2:
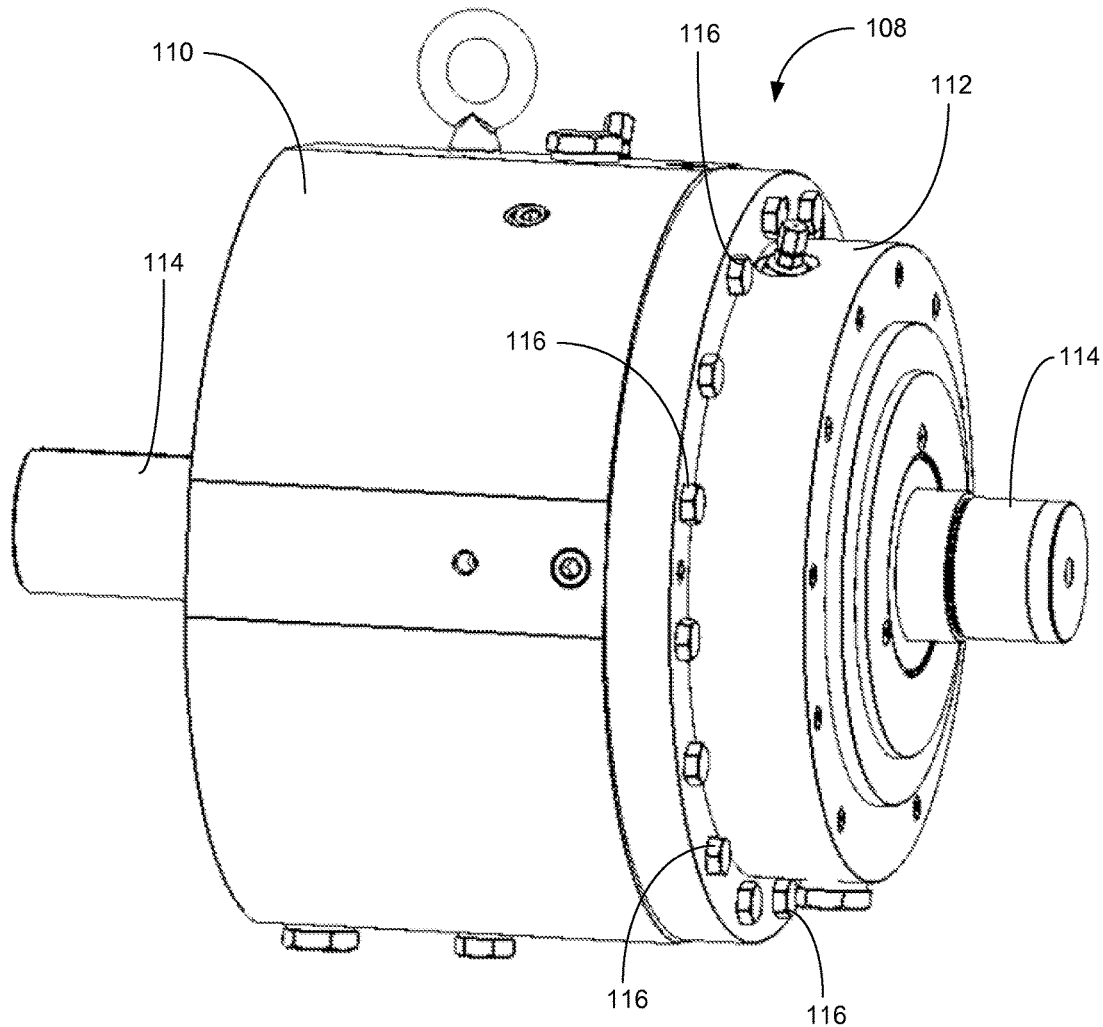
FIG. 2 is a perspective side view of the thrust chamber of the horizontal pumping system of FIG. 1.

Turning to FIG. 2, shown therein is a perspective view of the thrust chamber 108. The thrust chamber 108 includes a first housing 110, a second housing 112 and a thrust chamber shaft 114. The thrust chamber shaft 114 is configured to transfer torque from the motor 102 to a stub shaft (not shown) that extends into the suction housing 104. The first housing 110 and second housing 112 are configured to be secured together with housing fasteners 116. The first and second housings 110, 112 cooperatively contain the internal components of the thrust chamber 108.

Figure 3:
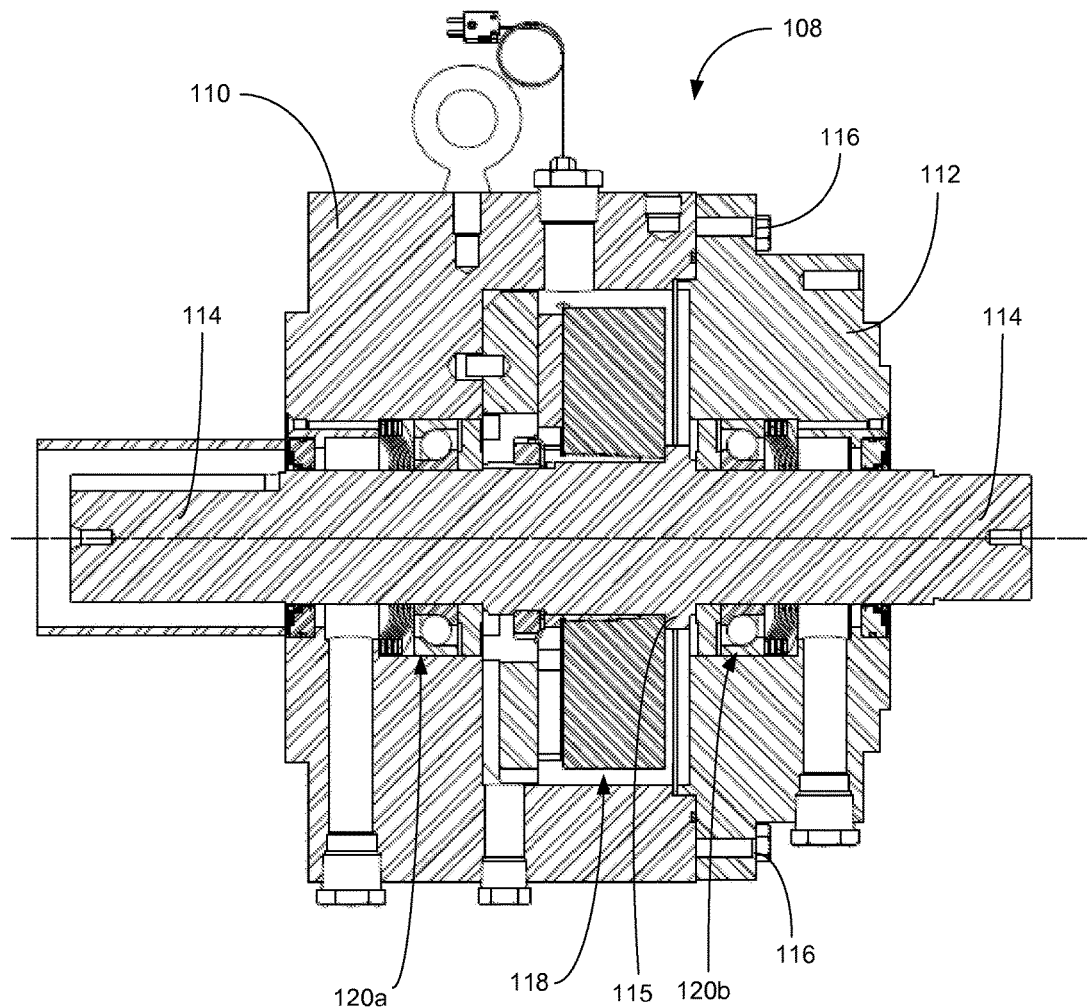
FIG. 3 is a cross-sectional side view of the thrust chamber of FIG. 2.

Turning to FIG. 3, shown therein is a cross-sectional view of the thrust chamber 108. The thrust chamber 108 includes a thrust bearing assembly 118 and a pair of radial bearings 120a, 120b. The radial bearings 120a, 120b are preferably positioned on opposite sides of the thrust bearing assembly 118 and provide radial support to the thrust chamber shaft 114. In a particularly preferred embodiment, the radial bearings 120a, 120b are ball bearings that include an outer race secured within either the first housing 110 or second housing 112 and an inner race secured to the thrust chamber shaft 114. As noted in FIG. 3, the thrust chamber shaft 114 includes a shaft shoulder 115 that abuts the thrust bearing assembly 118.

Figure 4:
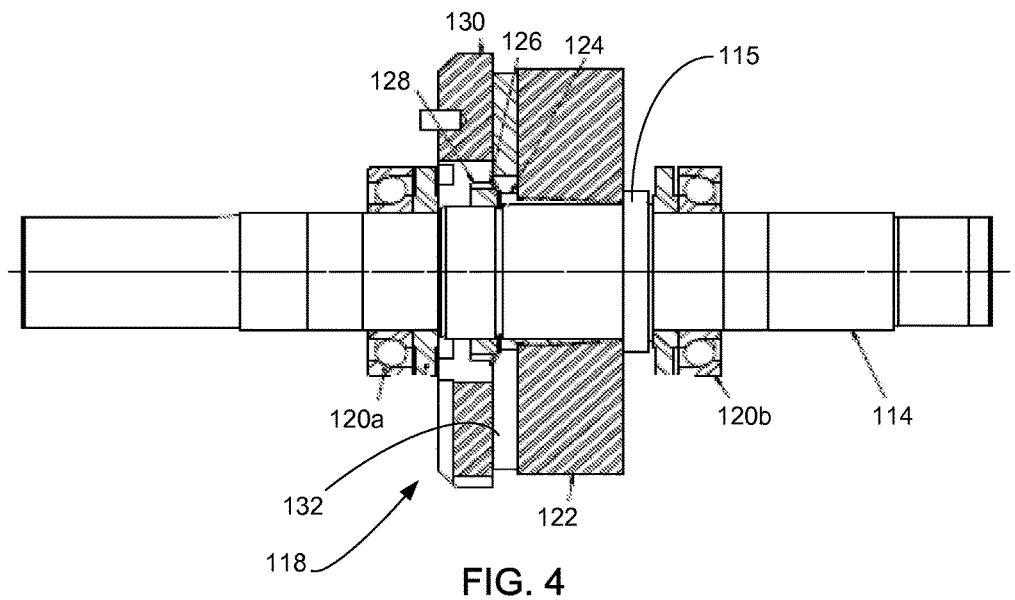
FIG. 4 is a partial cross-sectional view of the thrust bearing assembly and shaft of the thrust chamber of FIG. 2.
Figure 5:
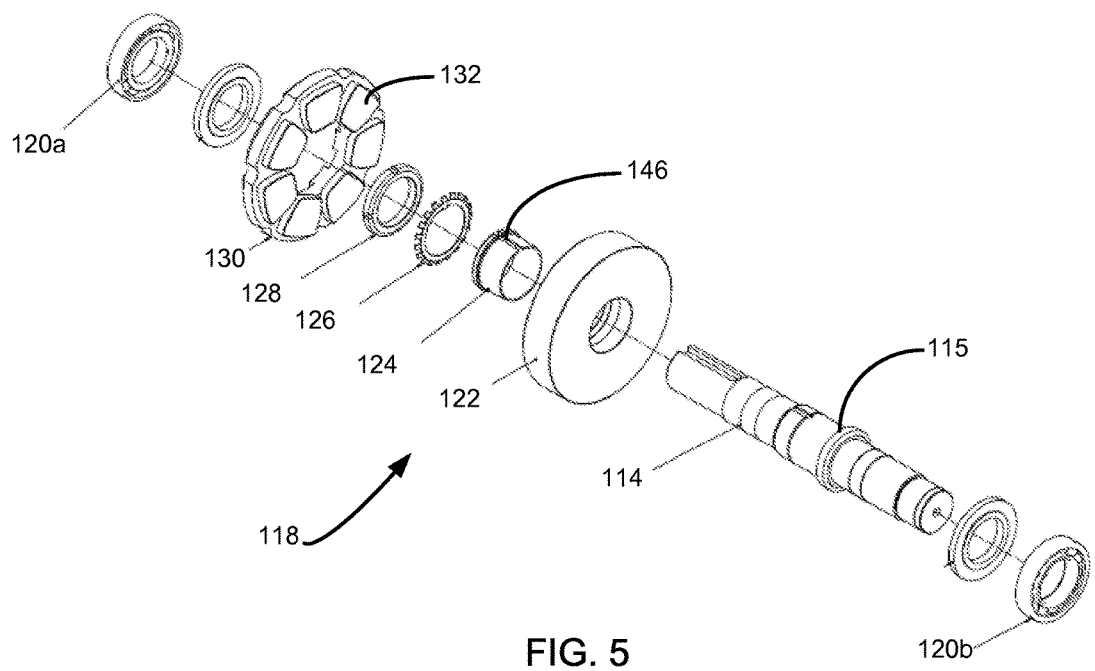
FIG. 5 is an exploded view of the thrust bearing assembly, shaft and ball bearing assemblies.

As more clearly illustrated in FIGS. 4 and 5, the thrust bearing assembly 118 includes a thrust runner 122, a taper sleeve driver 124, a lock washer 126, an internally threaded lock ring 128 and a thrust bearing 130. The thrust bearing 130 preferably includes thrust pads 132 and is stationarily secured within the first housing 110. When fully assembled, thrust runner 122 is placed in close proximity with the thrust pads 132 on the thrust bearing 130. In the presently preferred embodiments, the thrust bearing assembly 118 functions as a hydrodynamic bearing that optimally includes a quantity of fluid between the thrust bearing 130 and the thrust runner 122. The hydrodynamic bearing provides a stable, low-friction interface between the thrust runner 122 and thrust bearing 130.

Figure 6:
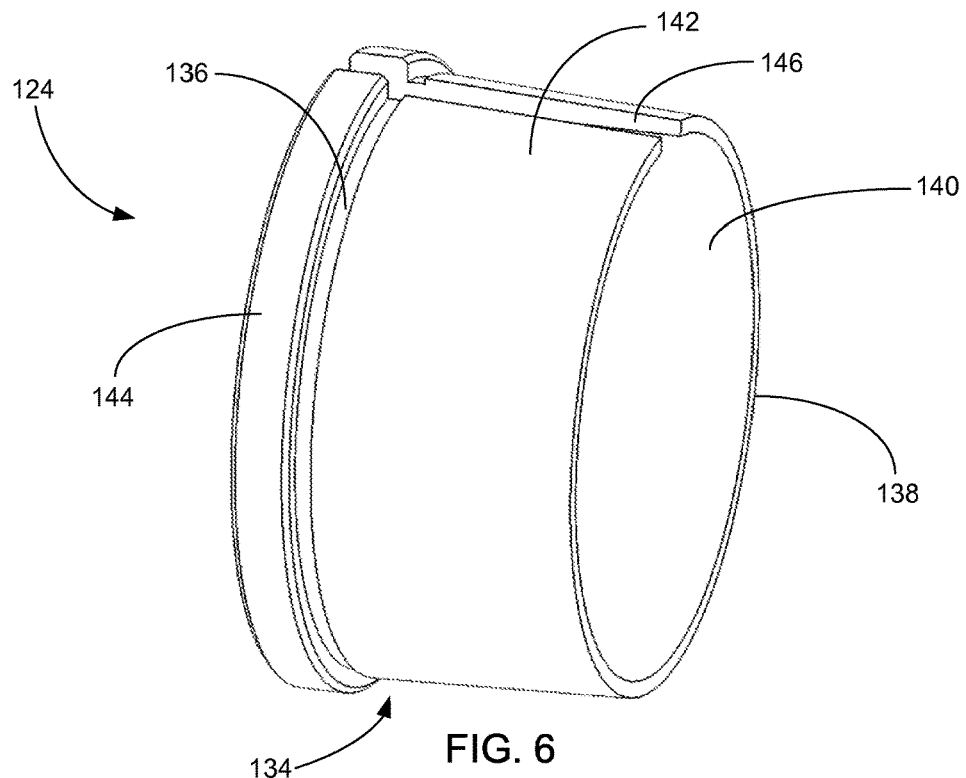
FIG. 6 is a perspective view of the taper sleeve driver of the thrust bearing assembly of FIG. 5.

Unlike prior art thrust bearings, the thrust runner 122 of the preferred embodiments is secured to the thrust chamber shaft 114 with the taper sleeve driver 124. As best depicted in FIG. 6, the taper sleeve driver 124 includes a conical body 134 that includes a first end 136 and a second end 138. The conical body 134 has an interior surface 140 with a substantially constant diameter and an exterior surface 142 that tapers in thickness from the first end 136 to the second end 138. The taper sleeve driver 124 preferably includes a lip 144 that extends radially outward from the exterior surface 142 adjacent the first end 136. The taper sleeve driver 124 optionally includes a channel 146 extending longitudinally through the lip 144 and conical body 134 that provides taper sleeve driver 124 the freedom to shrink in diameter as it is being forced into thrust runner 122.

Figure 7:
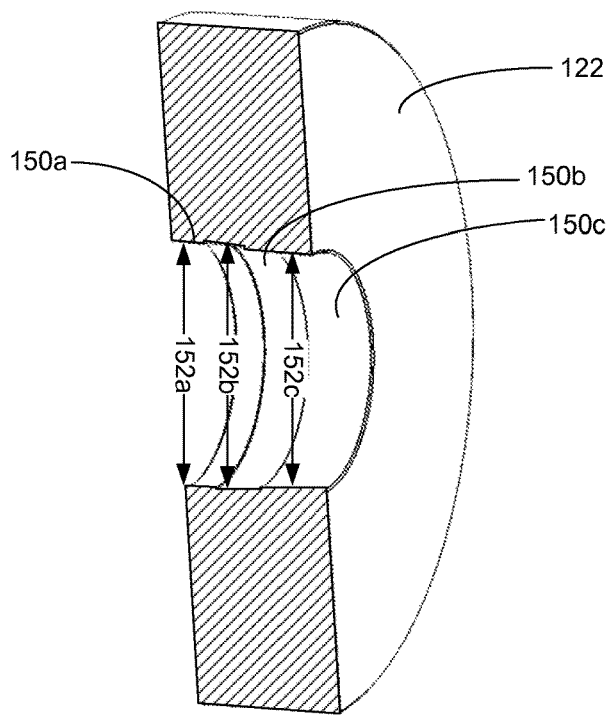
FIG. 7 is a cross-sectional view of the thrust runner of the thrust bearing assembly of FIG. 5.

Turning to FIG. 7, shown therein is a cross-sectional view of the thrust runner 122. The thrust runner 122 is generally toroidal and includes a central passage 150 that is configured to conform to the taper sleeve driver 124. In preferred embodiments, the central passage 150 has a stepped profile that is formed by two or more different inside diameters. In the particularly preferred embodiment depicted in FIG. 7, the thrust runner 122 includes a first passage portion 150a with a first diameter 152a, a second passage portion 150b with a second diameter 152b and a third passage portion 150c with a third diameter 152c.

The third diameter 152c is smaller than the first diameter 152a, and the first diameter 152a is smaller than the second diameter 152b. The first diameter 152a is nominally the same size as the diameter of the exterior surface 142 at the first end 136 of the taper sleeve driver 124. The third diameter 152c is nominally the same size as the diameter of the exterior surface 142 at the second end 138 of the taper sleeve driver 124. The profile of the central passage 150 of the thrust runner 122 ensures a tight fit between the taper sleeve driver 124 and the thrust runner 122. Additionally, the "relief" created by the second passage portion 150b allows the contact between the thrust runner 122 and the taper sleeve driver 124 to be focused on the first and third passage portions 150a, 150c. Directing contact between the taper sleeve driver 124 and thrust runner 122 to the outer edges reduces the likelihood of an axial imbalance or wobbling that might otherwise occur.

Referring now to FIGS. 3-7, during the assembly of the thrust bearing assembly 118, the thrust runner is placed over the thrust chamber shaft 114. The taper sleeve driver 124 is then placed over the end of the thrust chamber shaft 114. As the taper sleeve driver 124 is approximated and engaged within the thrust runner 122, the conical body 134 exerts an outward force against the thrust runner 122, thereby radially centering the thrust runner 122 on the thrust chamber shaft 114. In this way, the taper sleeve driver 124 provides a substantially uniform clamping force to lock the thrust runner 122 into engagement with the thrust chamber shaft 114. The taper sleeve driver 124 also exerts an axial force on the thrust runner 122 pressing against the shaft shoulder 115. This contact allows the shaft shoulder 115 to transmit the thrust load generated from the pump 106 to the thrust runner 122.

Next, the lock washer 126 and lock ring 128 are placed over the end of the thrust chamber shaft 114. The lock ring 128 is configured to be threaded onto a portion of the thrust chamber shaft 114 adjacent to the thrust runner 122. The lock ring 128 exerts an axial force against the taper sleeve driver 124 that causes the taper sleeve driver 124 to seat inside the thrust runner 122. The fit of the taper limits the extent of engagement between the taper sleeve driver 124 and the thrust runner 122. The lock washer 126 prevents the lock ring 128 from unthreading during operation. Once the thrust runner 122 has been centered and clamped into position on the thrust chamber shaft 114, the assembled thrust chamber shaft 114 and thrust runner 122 can be placed inside the first housing to bring the thrust runner 122 into position adjacent the thrust bearing 130. The radial bearings 120 and remaining components within the thrust chamber 108 can then be installed.

Thus, the taper sleeve driver 124 and matching thrust runner 122 provide a reliable and facilitated mechanism for centering and securing the thrust runner 122 to the thrust chamber shaft 114. The thrust bearing assembly 118 of the preferred embodiments is less susceptible to unintended radial and axial movement than thrust runners secured using prior art key-and-slot-ring mechanisms. Accordingly, the use of the taper sleeve driver 124 and matching thrust runner 122 presents a significant improvement over the prior art.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A thrust chamber for use in a horizontal pumping system, the thrust chamber comprising:
    a housing;
    a thrust chamber shaft that extends through the housing; and
    a thrust bearing assembly, wherein the thrust bearing assembly comprises:
        a taper sleeve driver, wherein the taper sleeve driver comprises:
            an interior surface configured to fit around the thrust chamber shaft; and
            an exterior surface; and
        a thrust runner, wherein the thrust runner includes a central passage that is configured to fit around the exterior surface of the taper sleeve driver.

2. The thrust chamber of claim 1, wherein the taper sleeve driver includes a first end and a second end and wherein the exterior surface of the taper sleeve driver tapers from a first diameter at the first end to a second diameter at the second end.

3. The thrust chamber of claim 2, wherein the central passage of the thrust runner includes a profile that substantially matches the tapered exterior surface of the taper sleeve driver.

4. The thrust chamber of claim 3, wherein the central passage comprises:
   a first portion that has a first diameter;
   a second portion that has a second diameter; and
   a third portion that has a third diameter.

5. The thrust chamber of claim 4, wherein the third diameter is smaller than the first diameter and wherein the second diameter is larger than the first diameter.

6. The thrust chamber of claim 5, wherein the first diameter matches the diameter of the exterior surface at the first end of the taper sleeve driver and wherein the third diameter matches the diameter of the exterior surface at the second end.

7. The thrust chamber of claim 1, wherein the thrust bearing assembly further comprises:
   a lock washer; and
   a lock ring that secures the taper sleeve driver in engagement with the thrust runner.

8. The thrust chamber of claim 7, wherein the lock ring is configured for threaded engagement with the thrust chamber shaft.

9. The thrust chamber of claim 1, further comprising a thrust bearing that is stationarily connected to the housing.

10. The thrust chamber of claim 1, further comprising one or more radial bearings, wherein each of the one or more radial bearings comprises ball bearings.

11. A horizontal pumping system comprising:
   a motor;
   a pump driven by the motor; and
   a thrust chamber connected between the motor and the pump, wherein the thrust chamber comprises:
      a housing;
      a thrust chamber shaft that extends through the housing; and
      a thrust bearing assembly, wherein the thrust bearing assembly comprises:
         a thrust runner having a central passage; and
         a taper sleeve driver having an interior surface in contact with the thrust chamber shaft and an exterior surface in contact with the central passage.

12. The horizontal pumping system of claim 11, wherein the taper sleeve driver includes a tapered exterior surface and the central passage of the thrust runner includes a stepped profile that matches the tapered exterior surface of the taper sleeve driver.

13. The horizontal pumping system of claim 12, wherein the central passage of the thrust runner further comprises:
   a first portion that has a first diameter;
   a second portion that has a second diameter; and
   a third portion that has a third diameter.

14. The horizontal pumping system of claim 13, wherein the third diameter is smaller than the first diameter and wherein the second diameter is larger than the first diameter.

15. The horizontal pumping system of claim 11, wherein the taper sleeve driver further comprises a lip extending radially from the exterior surface.

16. The horizontal pumping system of claim 11, wherein the thrust bearing assembly further comprises:
   a lock washer; and
   a lock ring that secures the taper sleeve driver in engagement with the thrust runner.

17. A thrust bearing assembly configured to reduce the axial displacement of a shaft, the thrust bearing assembly comprising:
   a stationary thrust bearing;
   a thrust runner adjacent to the thrust bearing, wherein the thrust runner includes a central passage; and
   a taper sleeve driver, wherein the taper sleeve driver includes an interior surface configured to fit around the shaft and an exterior surface configured to fit inside the central passage of the thrust runner.

18. The thrust bearing assembly of claim 17, further comprising a lock ring, wherein the lock ring applies an axial force against the taper sleeve driver to secure the taper sleeve driver inside the central passage of the thrust runner.

19. The thrust bearing assembly of claim 17, wherein the central passage includes a stepped profile and wherein the exterior surface of the taper sleeve driver matches the stepped profile of the central passage.

\* \* \* \* \*